INVENTOR
GEORGE H. SWEIGERT
BY
Baldwin, Doran & Egan
ATTORNEYS

INVENTOR
GEORGE H. SWEIGERT
BY
Baldwin, Doran & Egan
ATTORNEYS

June 10, 1969 G. H. SWEIGERT 3,449,750

DUPLEX RADIO COMMUNICATION AND SIGNALING APPARATUS FOR PORTABLE TELEPHONE EXTENSION

Original Filed May 2, 1966

INVENTOR
GEORGE H. SWEIGERT
BY
Baldwin, Doran & Egan
ATTORNEYS

INVENTOR
GEORGE H. SWEIGERT
BY
Baldwin, Doran & Egan
ATTORNEYS 3,449,750

DUPLEX RADIO COMMUNICATION AND SIGNALING APPARATUS FOR PORTABLE TELEPHONE EXTENSION

George H. Sweigert, Euclid, Ohio, assignor to John H. Shafer, Euclid, Ohio

Continuation of application Ser. No. 546,762, May 2, 1966. This application Apr. 4, 1968, Ser. No. 718,960
Int. Cl. H04l 5/00
U.S. Cl. 343—177 2 Claims

ABSTRACT OF THE DISCLOSURE

A telephone communication system for use with a conventional subscriber's domestic telephone instrument and which includes a transmitter-receiver unit at the subscriber's location acoustically coupled to the telephone instrument, a portable transmitter-receiver unit for use at a remote location and which is easily carried in the hand of the user; the transmitter at the subscriber's location and the receiver at the remote location being operable on a preselected first radio frequency and the transmitter at the remote location and the receiver at the subscriber's location being operable on a second radio frequency whereby to enable simultaneous two-way voice communication between the remote location and the subscriber's location.

This application is a continuation of application Ser. No. 546,762, filed May 2, 1966, now abandoned.

This invention relates generally to a telephone communication system and more particularly to a telephone unit which may be used with a typical subscriber's telephone to enable an operator to receive telephone calls from a remote location, said unit enabling normal telephone simultaneous two-way communication to be carried on with the said subscriber's telephone and the calling station without any change in wiring, etc. between said unit and the subscriber's telephone.

The primary object of this invention is to provide a telephone unit which may be used with a typical subscriber's telephone so as to extend the useful physical range of the subscriber's telephone to include a plurality of remote locations and without the use of interconnecting wires between said telephone and unit.

Another object of this invention is to provide the user with a telephone handset type of unit which will enable him to communicate, using duplex or two-way transmission of intelligence (simultaneously transmitting and receiving) by means of wireless transmission, with a subscriber's telephone.

Another object is to enable the user to have a mobile or remote telephone unit on his person which will enable him to simultaneously talk and listen over his subscriber's telephone located at his office or home.

Still another object of this invention is to allow a user to monitor the calls on his subscriber's telephone at a remote location and without the use of line tapping or interconnecting wires.

Another object of this invention is to provide an immediate wireless link to any type telephone, thereby providing paging service or on the spot reporting through a telephone line, while having the mobility afforded by a "walkie talkie" type of communication device.

Additional objects and advantages of the telephone unit of the present invention will be apparent to one skilled in the art to which it pertains and upon reference to the following description of a preferred embodiment thereof, and which is illustrated in the accompanying drawings wherein.

Briefly, the telephone unit of the present invention, as incorporated for use with a subscriber's telephone instrument enables a person to answer his telephone from a remote location such as for example, an executive to answer his office telephone from the back of a plant or the like, or a person to answer his telephone while outside of his home and so on.

As will be hereinafter described, the telephone unit of the present invention is capable of performing in this manner without being electrically connected into the conventional telephone communication system.

The telephone unit of the present invention consists of a first or remote transmitter-receiver unit which may be carried on the person of the user or located at a preselected remote position, and a second or station transmitter-receiver unit located at the subscriber's usual telephone installation and which is operable in conjunction with said telephone installation to permit two-way simultaneous communication between said telephone installation and a calling station.

Assuming that a person about to be called has the remote telephone unit on his person and he is at a distance from his regular telephone instrument as for example 200 feet, the telephone unit as incorporated with said regular instrument operates in the following manner.

Assuming that an incoming call is being received on the subscriber's regular telephone instrument wherein the telephone bell rings to indicate that such call is being received, the station unit is capable of carrying this incoming call signal to the remote unit so that the person is aware of such incoming call. Thereafter the person called may actuate the remote and station telephone units so as to connect himself through said units and the regular telephone instrument in such manner as to carry on simultaneous two-way voice communication with the person initiating the incoming call, thereby enabling communication to be carried on without the necessity of the person being called having to go directly to the telephone instrument.

At the conclusion of the incoming call, the person called can then deactivate the telephone instrument so as to ready the same for the next incoming call.

Figures 1, 1A:
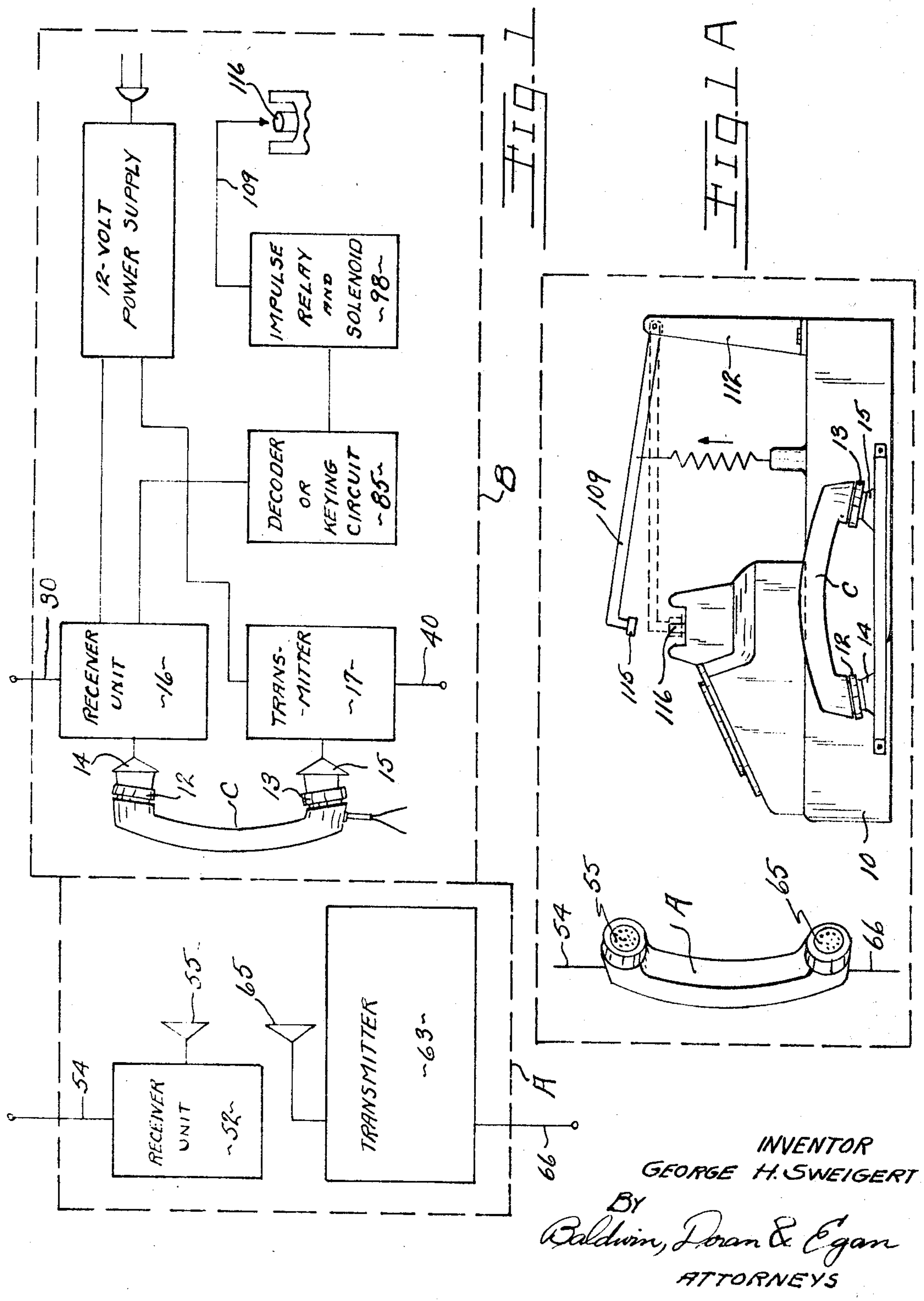
FIGURE 1 is a schematic block diagram of the telephone communication unit of the present invention shown incorporated for use with a conventional handset type of telephone instrument.
FIGURE 1A is a side elevational view showing the manner in which the conventional telephone instrument is used with the telephone unit of the present invention.

More particularly and with reference now directed to FIGURE 1 of the drawings, the telephone device of the present invention incorporates a remote telephone unit identified in its entirety by the reference character A which, as aforesaid, may be carried on the person of the individual who intends to communicate through his regular telephone instrument with an incoming caller.

The instant telephone unit also includes the station unit identified in its entirety by the reference character B which is located at and operable with the regular or conventional subscriber's telephone instrument C to enable two-way communication with remote unit A.

Figure 2:
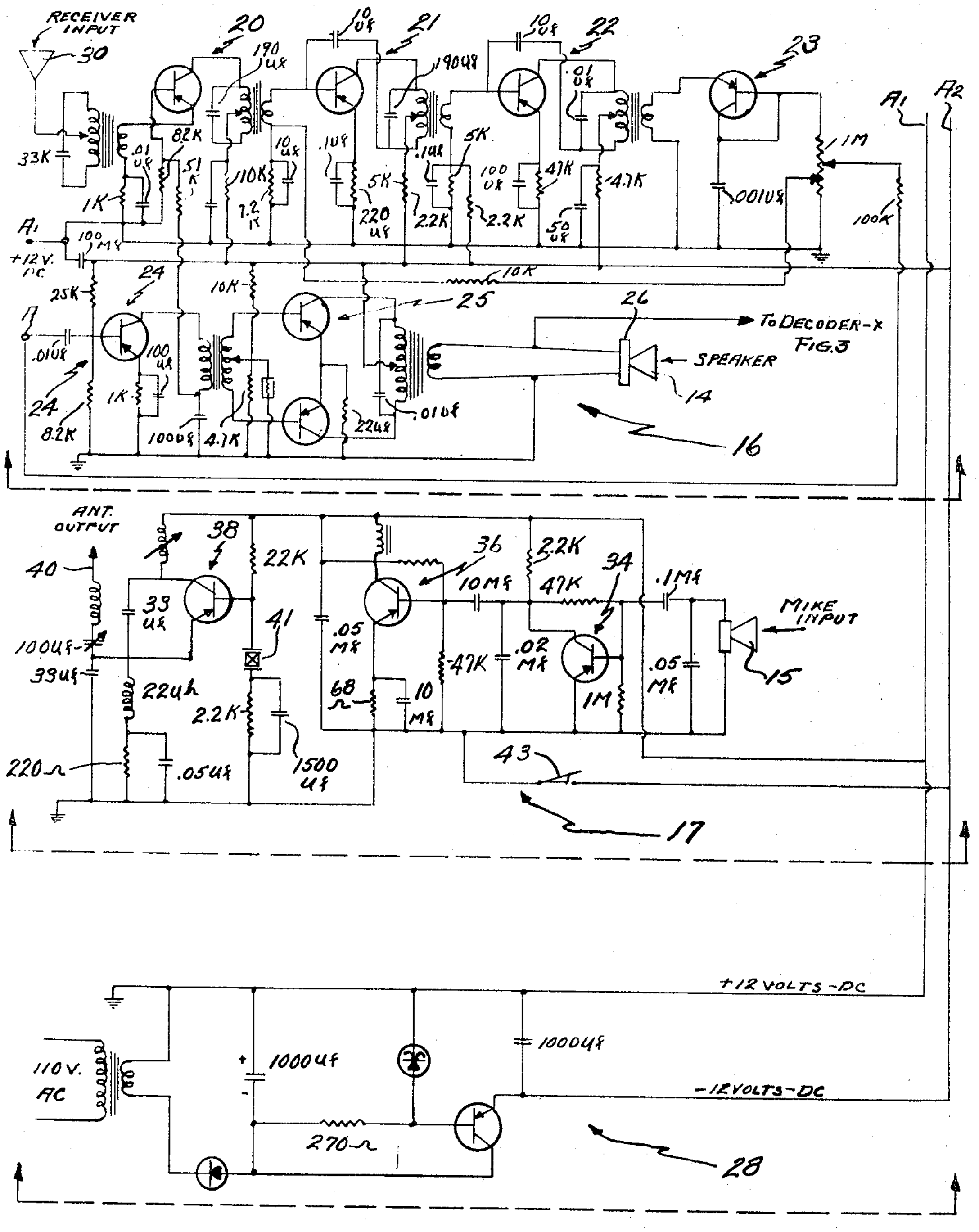
FIGURES 2 and 3 are schematic wiring diagrams of the electrical circuitry comprising the part of the telephone unit of the present invention located at the subscriber's telephone instrument; and, FIGURES 4 and 5 are schematic wiring diagrams of the electrical circuitry comprising the part of the telephone unit that may be carried on the person of the user at a remote position.

As seen particularly in FIGS. 1A and 2, one type of telephone instrument C commonly known as a cradle type instrument is shown to be preferably placed upon the top of the housing 10 in which the various components comprising the station unit B are disposed. The instrument C is seen to be located alongside the housing 10 and supported by its microphone 12 and speaker 13 respectively on the speaker output 14 and microphone input 15 forming respectively the audio output and audio input of the unit B being thereby acoustically coupled to said instrument.

As best seen in FIG. 2 station unit B includes a voice communication receiver indicated in its entirety by the reference numeral 16 and a voice communication transmitter indicated in like manner by reference numeral 17.

The receiver unit 16 preferably consists of conventional solid state circuitry and in its present configuration is seen to comprise a super-heterodyne type of receiver circuitry having preferably six stages, a converter stage as indicated at 20, first and second intermediate frequency stages identified at 21 and 22 respectively, a demodulator and automatic volume control stage as indicated generally at 23, an audio frequency stage as indicated at 24 connected into a conventional push-pull power amplifier stage 25, the latter being transformer coupled to a conventional audio speaker previously identified at 14.

Each of said stages is likewise seen to be preferably transformer coupled to its next succeeding stage. The receiver unit is also intended to be powered from a suitable conventional 12 volt direct current power supply of the circuit configuration shown at 28. This power supply, with the value of components indicated, is capable of providing plus or minus 12 volts direct current energy capable of working within one percent regulation.

The power supply includes a transistor $q_1$ connected into its output so as to provide suitable voltage regulation for the power supply. Likewise, a Zener diode $d_1$ is seen to be connected into the base circuit of the transistor $q_1$ so as to provide a suitable reference voltage of approximately six to eight volts above ground to maintain said base electrode operating within said range.

The super-heterodyne receiver unit 16 is intended to operate on any preselected frequency which is predetermined for each unit so as not to cause interference or to receive signals or communications for any other unit located in the near vicinity.

For example, one such frequency may be 30 megacycles.

In the manner well known in the art radio frequency signals intercepted by the antenna 30 of the receiver unit 16 are converted into audio frequency, amplified and applied to the output speaker 14 as audio speech.

As aforementioned, the speaker 14 is mounted on its housing 10 to provide support for one end of the telephone instrument C whereby the microphone device 12 of said instrument is accoustically coupled to said speaker 14, capable thereby of receiving audio information and transmitting it through said instrument to the calling station or individual in the normal manner.

The transmitter unit 17 as best seen in FIG. 2 is also of conventional design and comprises basically three operational stages of solid-state circuitry, namely a microphone input 15 connecting to an audio frequency speech amplifier stage 34, the output of which is coupled to a modulator stage 36, the latter in turn connecting into the input of an RF oscillator and amplifier as indicated in its entirety at 38. The output of the RF oscillator and amplifier stage is seen to be connected in the usual manner to the output antenna 40.

The transmitter unit 17 is also selected to operate at a predetermined frequency, said frequency being preferably controlled by means of a suitable frequency determining element disposed in the oscillator circuitry of said stage such as the crystal element 41, the latter being shown herein merely for purposes of illustration connected into the base circuit of the oscillator which in this instance is seen to be a Colpitts type. The station transmitter 17 is also connected to the aforesaid power supply 28 and has an on-off switch as indicated at 43 connected in series with one side of the power supply to enable manual control of its operation. The transmitter 17 is intended to operate with the values of the components herein disclosed at a frequency of 24.5 megacycles. However, as will later be apparent, other frequencies may be selected. The conventional microphone input to the transmitter as identified at 15 is connected into the base-emitter circuit of the audio frequency speech amplifier stage 34, said microphone 15 being disposed on the side of the housing 10 spaced from the speaker 14 and thus providing support for the speaker 13 of the conventional telephone instrument being thereby accoustically coupled to said speaker so that audio communication originating at the calling station is transmitted to said microphone 15 and thence by the transmitter unit 17 through its output antenna 40 whence it is picked up by the receiver of the remote unit A in the manner as will be hereinafter described to provide directional communication between the station unit B and the remote unit A.

Figures 4, 5:
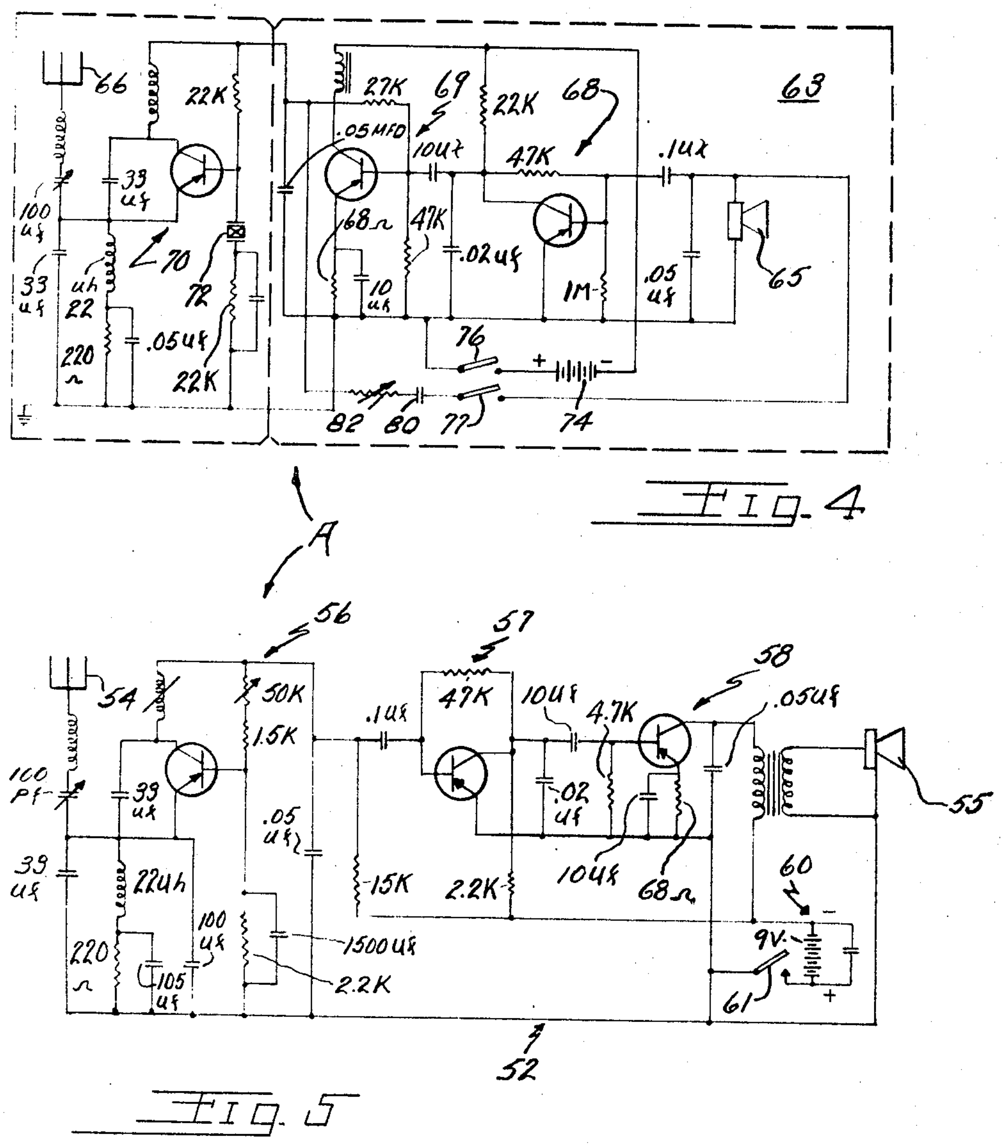

Referring now to FIG. 5 the remote unit A comprises a communication receiver 52 of conventional solid-stage circuitry design which is capable of intercepting intelligence by means of its input antenna 54 from the transmitter unit 17 and transforming the same into audible intelligence to its output speaker 55 whereby the person at the remote location can discern and understand the intelligence which, as aforementioned, originates with the party calling the location at which the telephone instrument is disposed.

The receiver 52 in its present configuration of circuitry is shown to be of conventional design being basically a superheterodyne circuit having a detector stage 56 connecting at its input to the antenna 54, an audio stage 57 connected to the input of a power amplifier 58, the latter by transformer coupled to the aforesaid speaker output 55.

The receiver is preferably a self-contained unit and for this purpose utilizes a 9 volt battery source of power as indicated at 60.

An on-off switch 61 connected between the battery 60 and the emitter circuit of the audio amplifier 57 and power amplifier 58 enables the operator of the remote unit to manually control the actuation of the receiver 52.

The remote unit A likewise includes a transmitter device 63 which has a suitable microphone input 65 and an antenna output 66 whereby speech or other intelligence directed to the microphone input 65 is transformed into corresponding radio frequency singals and emitted from the said transmitter 60 through its output antenna 66 whereby the same is intercepted by the antenna input 30 of the receiver unit 16 of the station device B.

The remote unit A also is seen to include a keying circuit which in its present configuration is intended to enable the person at the remote station to signal the communication system at the station unit that he is ready to proceed with communicating with the incoming calling party.

As best seen in FIG. 4 the transmitter unit 63 is constructed of conventional solid-state circuitry being likewise super-regenerative in operation.

The microphone input 65 is seen to connect to the input of an audio frequency speech amplifier 68, the output of which connects to a modulator stage 69 which, in turn, connects to the input of the radio frequency oscillator and output amplifier stage 70.

With the circuit components disclosed, the transmitter 63 is intended to operate at a frequency of approximately 30 megacycles thus matching with the frequency of operation of the receiver 16 of the station unit B.

The transmitter frequency is preferably provided and controlled by crystal 72 connected into the base-emitter circuit of the radio frequency amplifier 70.

The transmitter 63 is likewise intended to be self-contained and for this purpose it utilizes a 9 volt D.C. battery 74 to provide its electrical power. An on-off switch 76 is seen to have one of its switch contacts connected between the battery 74 and the emitter-base circuits of amplifier 68 and modulator 69 whereby the operator may manually control the operation of said transmitter 63.

The transmitter 63 is also provided with a keying or signalling circuit which is operator controlled to generate a signal which is then transmitted to the receiver 16 at the station unit B whereby the communication system at said station B is advised that the person at the remote location A is ready to communicate with the calling party.

In its present circuit configuration, which is merely one of many, the keying circuit includes a capacitor 80 connected at one end to the movable contact of a push button type switch 77, the associated stationary contact being connected to the input of the speech amplifier stage 68. The opposite end of capacitor 80 is connected to one end of an adjustable resistor 82, the opposite end of which is connected across the base-collector circuit of the modulator stage 69.

With this circuitry and with the switch 77 momentarily closed by the operator a keying signal is generated by the transmitter, the transmitter stages 68 and 69 acting as a two-stage audio oscillator, the component values of capacitor 80 and resistor 82 being selected to generate a keying signal in the range of 1,000 cycles per second.

This 1,000 cycle signal modulates the 30 megacycle carrier of the transmitter 63 and transmits the same to the receiver 16 of station unit B and is effective to operate the communication system at said station and enable communication therewith in the following manner.

Assuming that an incoming call ring is being received at the telephone instrument C this ring is transmitted by transmitter 17 to the receiver 52 at the remote location A to alert the individual being called of said incoming call.

Figure 3:
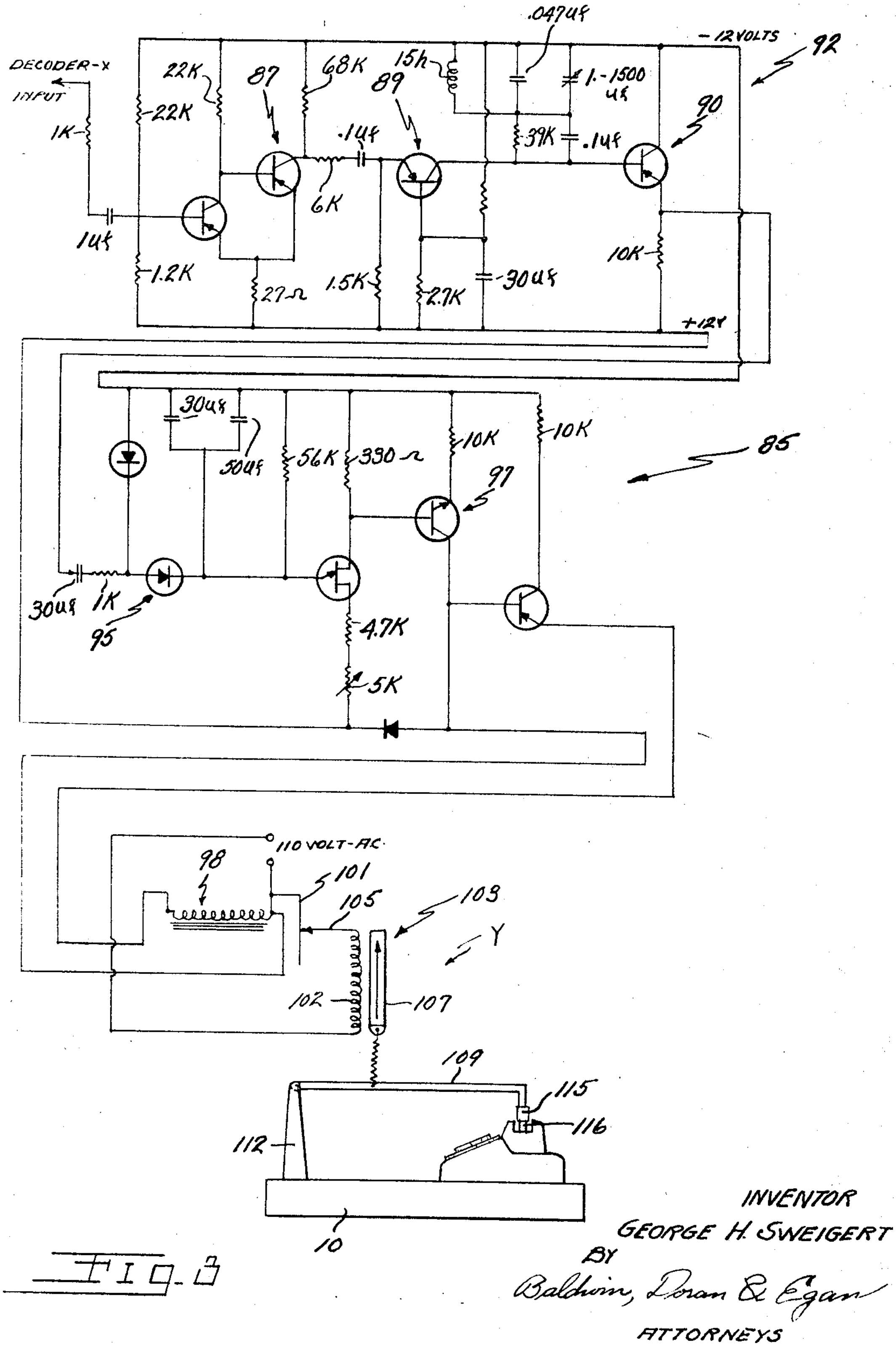

The individual then actuates the keying signal circuit to generate the 1,000 cycle signal which is then transmitted to the receiver 16 at the station unit B whereat it is demodulated, amplified and, as best seen in FIGS. 2 and 3, fed into the input of a decoder circuit indicated in its entirety at 85.

The decoder circuit is formed of conventional solid-state components being essentially a frequency selective tone modulated switch and includes a Schmitt trigger or flip flop circuit 87 at its input stage to which the aforesaid 1,000 keying signal is applied. The Schmitt trigger operates in the usual manner to produce a 1,000 cycle square wave output signal which is applied through a cathode follower stage 89 to amplifier 90, the latter having a band pass filter circuit 92 sharply tuned to 1,000 cycles whereby only the 1,000 cycle component of said square wave signal is amplified. The amplified signal is then applied to a demodulator stage 95 and thence to a three-stage amplifier 97 capable of producing a D.C. signal of approximately 15 milliwatts magnitude.

This output signal is then applied to the coil of a relay 98 which has a latching type movable contact 101.

A coil 102 of solenoid 103 is connected to the fixed contact 105 associated with latching contact 101, said latching contact being connected, in turn, to one side of the coil of relay 98. Said coil side is also seen to connect to one side of a suitable voltage source such as a 110 volt A.C. source. The opposite side of said voltage source is connected to the opposite end of said solenoid coil 102. The solenoid armature 107 is connected at its one end to a lever 109 intermediate its ends. Lever 109, in turn, is pivotally attached at its one end to an upstanding pedestal 112 mounted on the aforesaid housing 10. The opposite end of lever 109 mounts a bar 115 which overlies the cradle switch buttons 116 of the telephone instrument.

With the solenoid coil 102 deenergized the weight of bar 115 of lever 109 depresses the buttons 116 sufficiently to disconnect the telephone instrument from its telephone line.

With the keying signal applied across the coil 98, latching contact 101 is closed and latched so as to connect the solenoid coil 102 across the 110 volt source. As a result, the solenoid armature 107 is raised to swing the lever 109 about its pivot 112 permitting the buttons 116 to move upwardly to their closed position and connect the telephone instrument C to the incoming call.

When this occurs the individual is then connected to the incoming call and he is able to carry on a simultaneous two-way communication with the party or parties initiating said incoming call.

In normal use, the receiver 16 and transmitter 17 units are turned on in stand-by operation so as to receive and transmit the incoming ring to the remote unit A.

The receiver 52 of the remote unit is likewise normally turned on in stand-by operation so as to receive said incoming ring.

Thereafter, when a call is received, the operator at the remote location may actuate switch 76 to turn on the transmitter 63 and connect remote unit A with the station unit B and initiate two-way communication with said incoming call.

At the conclusion of the call, the individual at the remote location may again momentarily close switch 77 to actuate the keying signal whereby the latching relay 98 is unlatched and the solenoid armature 107 is permitted to fall which enables the lever 109 to swing downwardly engaging and depressing the buttons 116 and disconnecting said telephone instrument from its line and hence readying said instrument for the next call.

Having thus described a preferred embodiment of the communication system of the present invention, it will now be realized that an important basic feature of this invention is that simultaneous talking and listening can be accomplished with this device. Since both the remote and station units are receiving and transmitting during any transmission of intelligence, an operator at the remote station A can hear and speak at the same time as one does on a standard or conventional type telephone.

Another feature of this invention is that simultaneous transmission and reception of both remote and station units is accomplished with a minimum of accoustical or radio frequency interference.

Still another feature of this invention is that the ringing of the subscriber's telephone can either be heard directly by the remote operator either by listening to his receiver or it can signal the remote operator by triggering an audible tone which is interpreted in the remote handest's receiver.

Another interesting feature of this invention is that, after the call is finished, the station unit A is reprogrammed to accept another call by the remote operator. This he can accomplish by reapplying the audio tone in the remote units transmitter which reverses the switching action unit at the station unit to depress the switch buttons on the French type telephone.

What is claimed is:

1. A communication system adapted for use with a subscriber's telephone instrument to enable two-way communication between said instrument and a remote location comprising: means for actuating the telephone instrument from its quiescent at rest position to an activated position whereby to provide transmission and reception of audio intelligence; first audio transmitting and receiving means acoustically coupled to said telephone instrument in its activated position operable to transfer audio intelligence therebetween; a second audio transmitting and receiving means at said remote location operable to transmit and receive audio intelligence to and from said first receiving and transmitting means, respectively; the first receiving and transmitting means and the second receiving means being normally turned-on to provide substantially immediate communication; the first transmitting means and second receiving means being operable on a first radio frequency; the second transmitting means and first receiving means being operable on a different radio frequency than said first named radio frequency; said second transmitting means including an input circuit comprising audio amplifying means, modulator means connected to the output of said audio amplifying means, oscillator means connected to the output of said modulator means and operating at said different radio frequency, power supply means, first normally-open switch means connecting said power supply means to said second transmitting means and operable to a closed position effective to provide electrical energy to said second transmitting means, circuit means comprising a series circuit formed of a second normally-open switch means, capacitance means and resistance means connected between the input of the audio amplifying means and the output of the modulating means, said circuit means being operable upon the closing of said second switch means while said first switch means is also closed to change said amplifying means and said modulating means into audio oscillator means that generates an audio frequency keying signal and which modulates the signal output of said second transmitting means at said different radio frequency; and said first receiving means including circuit means operably connected to said actuating means for said telephone instrument and responsive to said keying signal for actuating said telephone instrument to its activated position.

2. A communication system as is defined in claim 1 and wherein the series circuit means is variable.

References Cited

UNITED STATES PATENTS

| | | | |
|---|---|---|---|
| 3,196,357 | 7/1965 | Hoag | 325—363 X |
| 2,023,222 | 12/1935 | Fyler | 325—155 |
| 3,198,888 | 8/1965 | Lemelson | 325—55 X |
| 3,240,879 | 3/1966 | Bryant | 179—41 |

ROBERT L. GRIFFIN, *Primary Examiner.*

BENEDICT V. SAFOUREK, *Assistant Examiner.*

U.S. Cl. X.R.

179—41; 325—16, 64, 155